US008500850B2

(12) United States Patent  (10) Patent No.: US 8,500,850 B2
Carati et al.  (45) Date of Patent: Aug. 6, 2013

(54) PROCESS AND ZEOLITIC MATERIALS FOR THE SEPARATION OF GASES

(75) Inventors: Angela Carati, San Giuliano Milanese (IT); Caterina Rizzo, San Donato Milanese (IT); Marco Tagliabue, Cologno Monzese (IT); Luciano Cosimo Carluccio, San Donato Milanese (IT); Cristina Flego, Milan (IT); Liberato Giampaolo Ciccarelli, San Giuliano Milanese (IT)

(73) Assignee: ENI S.p.A., Rome (IT)

( * ) Notice: Subject to any disclaimer, the term of this patent is extended or adjusted under 35 U.S.C. 154(b) by 740 days.

(21) Appl. No.: 12/306,335

(22) PCT Filed: Jun. 19, 2007

(86) PCT No.: PCT/EP2007/005439
§ 371 (c)(1),
(2), (4) Date: Feb. 18, 2009

(87) PCT Pub. No.: WO2008/000380
PCT Pub. Date: Jan. 3, 2008

(65) Prior Publication Data
US 2009/0288557 A1  Nov. 26, 2009

(30) Foreign Application Priority Data

Jun. 26, 2006 (IT) .................................. MI06A1231

(51) Int. Cl.
  *B01D 53/02*  (2006.01)
(52) U.S. Cl.
  USPC .......... 95/103; 95/90; 95/96; 95/117; 95/130; 95/136; 95/139; 95/140; 95/148; 423/700; 423/706
(58) Field of Classification Search
  USPC .............. 95/90, 96, 103, 117, 130, 136, 139, 95/140, 148; 423/700, 706
  See application file for complete search history.

(56) References Cited

U.S. PATENT DOCUMENTS

| 4,468,237 | A | * | 8/1984 | Fuderer | 95/100 |
|---|---|---|---|---|---|
| 5,362,522 | A | * | 11/1994 | Barri et al. | 427/435 |
| 5,567,664 | A | * | 10/1996 | Barri et al. | 502/4 |
| 5,919,287 | A | * | 7/1999 | Moreau | 95/130 |
| 5,922,107 | A | * | 7/1999 | Labasque et al. | 95/96 |
| 6,673,950 | B1 | * | 1/2004 | Teles et al. | 549/529 |
| 2002/0178914 | A1 | * | 12/2002 | Golden et al. | 95/129 |
| 2003/0028059 | A1 | * | 2/2003 | Hamper et al. | 585/323 |
| 2003/0145726 | A1 | * | 8/2003 | Gueret et al. | 95/96 |
| 2005/0240038 | A1 | * | 10/2005 | Gobbel et al. | 549/529 |
| 2007/0004926 | A1 | * | 1/2007 | Schindler et al. | 549/531 |
| 2007/0202038 | A1 | * | 8/2007 | Yaghi et al. | 423/702 |
| 2008/0083330 | A1 | * | 4/2008 | Subramanian et al. | 95/28 |

FOREIGN PATENT DOCUMENTS

| DE | 197 44 470 | 7/2000 |
|---|---|---|
| IT | 1 270 630 | 5/1997 |

OTHER PUBLICATIONS

Baerlocher, W.M. et al., "Atlas of Zeolite Framework Types, 5t$^{th}$ Revised Edition", Elsevier, Retrieved from the Internet: URL:http://www.iza-structure.org/databases/books/Atlas_5ed.pdf, p. 130-131 (2001) XP-002451739.

Campbell, B. J. et al., "The Synthesis of the New Zeolite, ERS-7, and the Determination of Its Structure by Simulates Annealing and Synchrotron X-Ray Powder Diffraction", Chem. Commun., pp. 1725-1726 (1998) XP-002419416.

Gerhartz, W. et al., "Ullmann's Encyclopedia of Industrial Chemistry", VCH VERLAG, vol. B 3, pp. 9-1, 9-4, 9-37-9-38, 9-46-9-47 and 9-52 (1988) XP-002451740.

Millini, R. et al., "The Synthesis of Zeolites ERS-7 and Its Structure Determination Using Simulated Annealing and Synchrotron X-Ray Powder Diffraction", 12$^{th}$ International Zeolite Conference, vol. 1, pp. 541-548 (1999) XP-008083940.

* cited by examiner

*Primary Examiner* — Christopher P Jones
(74) *Attorney, Agent, or Firm* — Oblon, Spivak, McClelland, Maier & Neustadt, L.L.P.

(57) ABSTRACT

The present invention relates to a process for the separation of gases which comprises putting a mixture of gases in contact with a zeolite of the ESV type to obtain the selective adsorption of at least one of the gases forming the gaseous mixture. The present invention also relates to particular zeolitic compositions suitable as adsorbents.

27 Claims, 1 Drawing Sheet

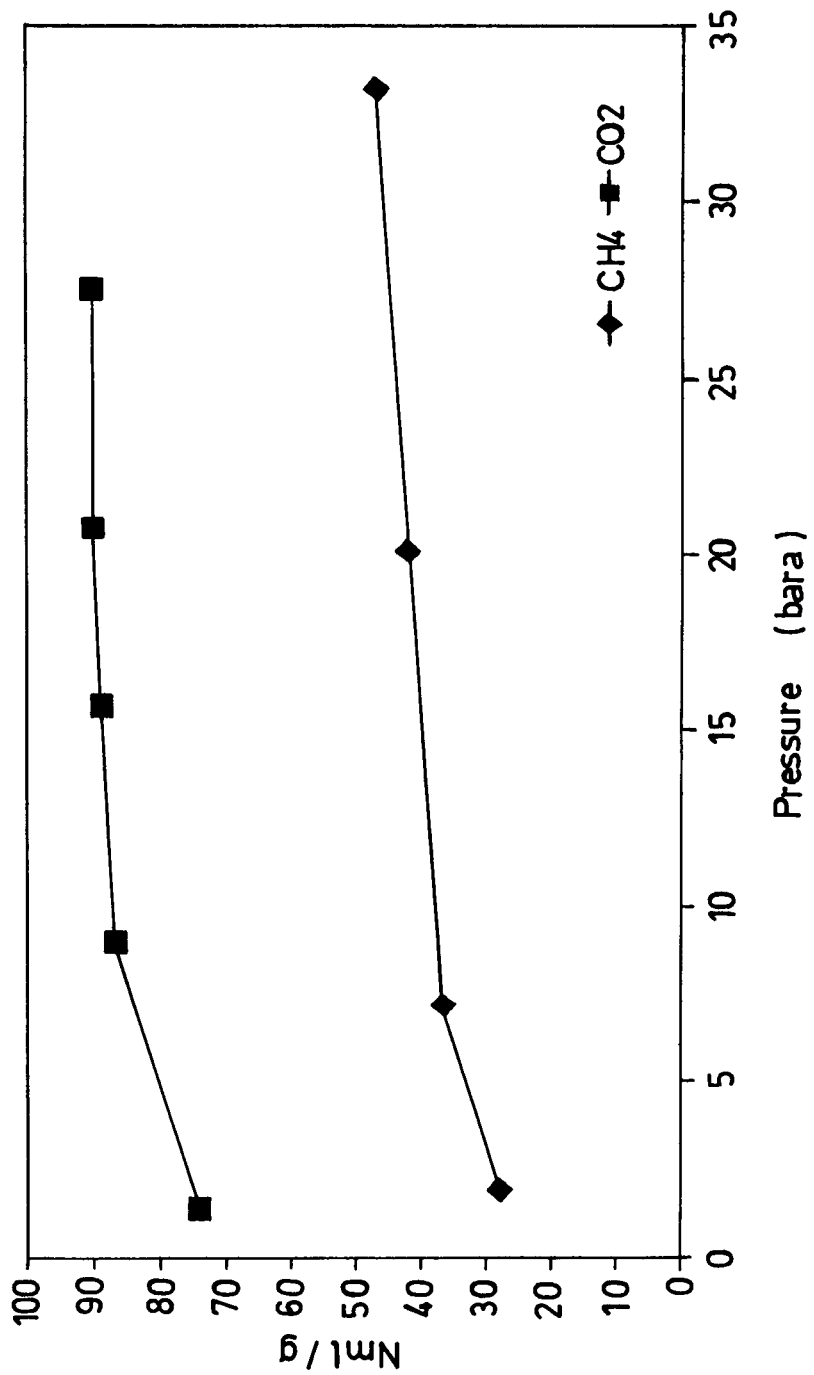

PROCESS AND ZEOLITIC MATERIALS FOR THE SEPARATION OF GASES

The present invention relates to a process for the separation of gases which comprises putting a mixture of gases in contact with a zeolite of the ESV type to obtain the selective adsorption of at least one of the gases forming the gaseous mixture. In particular the process is suitable for the softening of natural gas, especially for removing carbon dioxide and hydrogen sulfide from natural gas. The process can also be used in the separation of hydrogen from mixtures containing carbon dioxide, carbon monoxide and hydrocarbons (for example, gaseous effluents from steam methane reforming). In this case, the hydrogen is the non-adsorbed component.

The present invention also relates to particular adsorbing zeolitic compositions having an ESV structure.

The separation of gases mixed with each other can be effected using various methods. For the removal of nitrogen from natural gas, for example, cryogenic processes, adsorption processes or membrane systems can be used. In all these processes the gas is produced at a low pressure and must therefore be recompressed to allow it to be transported.

Furthermore, cryogenic processes are carried out at low temperatures and therefore require pretreatment to remove the components present in natural gas which solidify under these conditions.

In order to separate acid gases, such as $CO_2$ and $H_2S$ from natural gas, systems based on the use of amines in the presence of solvents can be used. The acid gases are then eliminated from the solvent by vapour stripping. The technology based on amines is applied for large volumes of gas to be treated.

With respect to the use of membranes in general, semipermeable membranes are known, which are capable of retaining the passage of one or more of the components of the gaseous mixture, allowing, on the other hand, the passage of the gas flow to be purified. In Guoqing Guan et al., Journal of Chemical Engineering of Japan, vol. 34, Nr. 8, pages 990-997, 2001, for example, the separation of nitrogen from oxygen using membranes containing zeolites of the FAU type is described.

In the case of the purification of natural gas, membrane systems are used for separating the carbon dioxide: the membranes consist of polymer films, without pores and extremely dense, in which the carbon dioxide dissolves and is transported by diffusion.

U.S. Pat. No. 3,616,607 describes the use of a membrane based on polyacrylonitrile to separate $N_2/CH_4$ with a high selectivity, but low permeability. U.S. Pat. No. 6,565,626 describes a process with organic membranes permeable to $CO_2$, $H_2O$, $H_2S$, $N_2$, but with a poor permeability to $CH_4$.

Adsorption cycles are also known, such as for example those of the pressure swing (PSA), thermal swing (TSA), vacuum swing (VSA), pressure-thermal swing (PTSA), pressure-vacuum swing (PVSA) type.

In particular, the separation of gases by means of Pressure Swing Adsorption (PSA) is well-known to experts in the field and allows the components of a gaseous mixture to be selectively adsorbed and separated. The desired product is normally only one of the components. Processes of the PSA type substantially comprise the following steps:

a first step in which the gaseous mix containing two or more gases is put in contact, at a high pressure, with an adsorbing material and one or more of the gases forming the mixture are selectively adsorbed; the adsorption normally takes place in short times, from 30 seconds to 5 minutes;

a subsequent step in which the gas or gases adsorbed are desorbed by means of one or more of the following systems: lowering of the pressure, washing with gas. In this way the desorption of the gas is obtained, which is thus recovered, regenerating the adsorbing agent itself;

and a last step, which concludes the cycle, in which the adsorbing bed is pressurized with the gas fed.

Many processes of this type use zeolites as adsorbing material. U.S. Pat. No. 2,882,243 for example, describes the use of zeolite A as adsorbent for separating nitrogen and oxygen. For the same type of separation, U.S. Pat. No. 3,140,933 describes the use of zeolite X. In U.S. Pat. No. 4,925,460 a chabazite exchanged with lithium is used for the separation of gas.

EP 758561 describes an adsorption process of nitrogen from gaseous mixtures containing it using suitably exchanged zeolites selected from chabazite, offretite, erionite, levinite, mordenite, zeolite A, zeolite T, EMC-2, ZSM-3, ZSM-18, ZK-5, zeolite L and zeolite beta. The separation of nitrogen from mixtures containing it together with methane is effected in U.S. Pat. No. 6,068,682 using a new molecular sieve containing titanium.

Engelhard Corporation has applied this material to a process called Molecular Gate, capable of separating nitrogen from methane (U.S. Pat. No. 6,197,092, U.S. Pat. No. 6,444,012). The Molecular Gate can also be applied to the removal of carbon dioxide from methane (U.S. Pat. No. 6,610,124). EP 1254694 describes the use of zeolite X for separating $CO_2$ and $H_2O$ from air. If necessary, the desorption phase of the gases from the adsorbent can be effected by thermal treatment (TSA), or by vacuum (VSA).

In separation processes based on adsorption/desorption cycles on adsorbing material, numerous variables are involved and determine their efficiency. The characteristics of the adsorbing material (for example, composition, porosity, surface properties) are at the basis of the separation capacity of the various gas components. Other variables can also be important: for example, sensitivity of the adsorbent to humidity can influence the surface reactivity (for example, hydroxylation degree) or porosity, or an insufficient stability can prevent the material from thermally regenerating to eliminate the accumulation of gas adsorbed. Low recoveries of the desired gas require onerous internal recyclings.

It has now been unexpectedly found that zeolites of an ESV structure can be used as adsorbents for the separation of gaseous mixtures giving extremely high selectivities, also such as to allow the direct use of the gas without requiring subsequent recycling or further purification steps.

Zeolites of the ESV type are also particularly stable and can therefore also undergo thermal treatment for restoring its adsorbing characteristics.

A first object of the present invention therefore relates to a process for the separation of gases which comprises putting a mixture of gases in contact with a zeolite of the ESV type to obtain the selective adsorption of at least one of the gases forming the gaseous mixture. The remaining gases forming the mixture pass through the zeolite bed and can then be separated. The adsorbed gas or gases are subsequently recovered and/or removed by desorption.

Zeolites of the ESV type are described in ATLAS OF ZEOLITE FRAMEWORK TYPES, Ch. Baerlocher, W. H. Meier, D. H. Olson, $5^{th}$ Revised Edition (2001) Elsevier.

In particular, zeolites belonging to the ESV family are zeolites of the ERS-7 type. These zeolites and their preparation were described for the first time in IT 1270630. Experimental procedures for the structural resolution of the ERS-7 zeolitic structure are described in Campbell, B. J. et al., Chem. Commun., 1725-1726 (1998) and Millini, R., Proc. 12$^{th}$ Int. Zeolite Conf., I, pages 541-548 (1999).

Zeolites of the ERS-7 type have a one-dimensional porous system with openings consisting of 8 tetrahedra and a free crystallographic diameter of 3.5×4.7 Angstrom. The dimension of the channels gives the ERS-7 zeolite specific molecular sieve properties in the purification of natural gas.

According to a preferred aspect, the zeolites used are zeolites of the ERS-7 type having in the calcined and anhydrous form the following general formula (I):

$$M_{2/n}O \cdot Al_2O_3 \cdot xSiO_2$$

wherein M is a cation having a valence n selected from H$^+$, metallic cations of the IA group, metallic cations of the IIA group and their mixtures, n=1 or 2, and x has a value ranging from 15 to 30.

According to an aspect of the present invention, M is at least a cation selected from H$^+$, Li$^+$, Na$^+$, K$^+$, Mg$^{2+}$, Ca$^{2+}$, Sr$^{2+}$, Ba$^{2+}$.

In particular M can be Na$^+$, or Na$^+$ and H$^+$, optionally mixed with one or more cations selected from Li$^+$, K$^+$, Mg$^{2+}$, Ca$^{2+}$, Sr$^{2+}$, Ba$^{2+}$.

Even more preferably, zeolites of the ERS-7 type are used in the form deriving directly from the synthesis, after drying and calcination, containing Na$^+$ ions and H$^+$ ions, the latter generated by the decomposition of the templating agent.

When zeolites of the ERS-7 are used, having formula (I) wherein M is at least partly a sodium ion, a particularly preferred aspect of the present invention is that it is present in a quantity ranging from 0.2 to 1 expressed as a Na/Al molar ratio.

Zeolites of the ERS-7 type having formula (I) wherein M is at least a cation selected from Li, Mg, Ca, Sr, Ba, optionally mixed with one or more cations selected from H$^+$ and Na$^+$ are new and are a further aspect of the present invention.

The synthesis of zeolites of the ERS-7 type used in the process of the present invention comprises reacting sodium silicate, aluminum sulfate, N,N-dimethylpiperidinium hydroxide or halide, under hydrothermal conditions so that there are the following molar ratios in the reagent mixture:

| | |
|---|---|
| SiO$_2$/Al$_2$O$_3$ | 15-30 |
| R/SiO$_2$ | 0.2-0.4 |
| H$_2$O/SiO$_2$ | 30-50 |
| Na/Al$_2$O$_3$ | 10-30 |
| OH$^-$/SiO$_2$ | 0.3-0.6 | wherein R is N,N-dimethylpiperidinium.

The operating temperature ranges from 150 to 200° C. for a period of time varying from 5 to 15 days.

The templating agent N,N-dimethylpiperidinium halide can also be synthesized in situ by the reaction between 1,5-pentyldihalide, dimethylamine and NaOH, in a relative molar ratio of 1:1.15:1.

The preparation process of ERS-7 zeolites in which the templating agent is N,N-dimethylpiperidinium halide is new and is an object of the present invention. A particular object of the present invention therefore also relates to the preparation process of ERS-7 zeolites in which the templating agent N,N-dimethylpiperidinium halide is prepared in situ as described above.

At the end of the synthesis, the resulting mixture is discharged, from which a solid is separated, by filtration, which, after washing with demineralized water and drying at a temperature ranging from 120 to 150° C. has the following composition (II):

$$yR_2O \cdot mM_2O \cdot Al_2O_3 \cdot xSiO_2 \qquad (II)$$

wherein 0<y≦1, 0<m≦1, R is N,N-dimethylpiperidinium, M is sodium, x has a value ranging from 15 to 30.

The material thus obtained is calcined at a temperature ranging from 5000 to 700° C. for 5-18 hours, preferably at 550-650° C. for a time ranging from 8 to 16 hours, in a stream of air to give a zeolite of the ERS-7 type having formula (I) wherein M is partly Na$^+$. H$^+$ ions, deriving from the degradation of R are also present in the material after calcination.

The zeolite of the ERS-7 type thus prepared can be subsequently partially or totally exchanged into other cationic forms having formula (I) by means of processes of the known art. Zeolite exchanged into acid form, for example, can be obtained therefrom by ion exchange treatment, at a temperature ranging from 20° C. to the boiling point of the mixture, with an aqueous solution having a concentration ranging from 0.01 to 0.5 M of an acid or organic ammonium salt which easily decomposes during the subsequent thermal treatment, such as for example ammonium acetate. At the end of the treatment it is dried at a temperature ranging from 100 to 150° C., for a time ranging from 30 minutes to 16 hours, in air or in an atmospheric flow either controlled or under vacuum.

When an ammonium salt is used, calcination must be subsequently effected at a temperature ranging from 300 to 600° C. for a time ranging from 1 to 7 hours.

Analogously, zeolites partially or totally exchanged with one or more cations selected from those of group IA and IIA, in particular Li, Na, K, Mg, Ca, Sr and Ba, having formula (I), are obtained directly from the zeolite resulting from the synthesis containing Na$^+$ and H$^+$ ions by means of processes of the known art, for example by partial or total ion exchange, with an aqueous solution having a concentration ranging from 0.01 to 0.5 M of an organic or inorganic salt of the cation or cations selected. The salts are selected from those easily soluble in water, for example nitrates, acetates or chlorides. In the case of partial exchange, the final zeolite will also contain Na$^+$ and H$^+$ ions. The exchange is effected at a temperature ranging from 20° C. to the boiling point of the mixture, the mixture is subsequently dried at a temperature ranging from 100 to 150° C., for a time ranging from 30 min to 16 hours, in air or an atmospheric flow controlled or under vacuum, and then calcined at a temperature ranging from 300 to 600° C. for a time ranging from 1 to 7 hours.

Zeolites of the ERS-7 type having formula (I) wherein M is at least a cation selected from Li, Mg, Ca, Sr, Ba, possibly mixed with one or more cations selected from H$^+$ and Na$^+$ are new, they represent a further aspect of the present invention and can be obtained from the zeolite directly deriving from the synthesis by means of partial or total exchange with an aqueous solution containing at least a salt of a cation selected from Li, Mg, Ca, Sr and Ba, according to the general preparation indicated above.

For the process of the present invention, the zeolites having an ERS-7 structure can be used in the form bound with an inorganic binder selected from inorganic materials such as clays, oxides of silicon, aluminum, magnesium, titanium, zirconium and mixtures thereof. The binding processes which can be used are those well known to experts in the field, such as for example, pressing techniques, extrusion, drop coagulation, atomization.

In the final bound product, the zeolite is contained in a proportion ranging from 50 to 95% by weight with respect to the total weight of the product, preferably from 60 to 90% by weight.

The process for the separation of gases of the present invention, which comprises putting a mixture of gases in contact with a zeolite of the ESV type and the selective adsorption of at least one of the gases forming the gaseous mixture, can be effected either by means of a membrane containing a zeolite of the ESV type, or by means of adsorption cycles. According to the latter technique, the gaseous mixture to be fractionated is put in contact with the ESV zeolite in order to selectively adsorb one or more components of the mixture itself. The non-adsorbed component is collected as a pure product, and the components withheld are periodically desorbed, for example by reducing the pressure and/or washing and/or an increase in temperature, in order to avoid saturation of the adsorbing bed.

Among the processes based on adsorption cycles those of the pressure swing (PSA), thermal swing (TSA), vacuum swing (VSA), pressure-vacuum swing (PVSA) pressure-thermal swing (PTSA) type can be conveniently used (D. M. Ruthven, S. Farooq, K. S. Knaebel, Pressure Swing Adsorption (1994) Wiley—VCH).

In the first case, Pressure Swing Adsorption, after the high pressure adsorption of at least one of the gases forming the gaseous mixture, and the separation of the remaining components of the mixture, the pressure is reduced to desorb the gas adsorbed and regenerate the zeolite.

In the case of a TSA process, the desorption step is effected, instead of by pressure reduction, by raising the temperature of the zeolite, or the adsorbing bed.

In the case of a PTSA process, the adsorption step is carried out at high pressure whereas the desorption step is effected by a temperature increase of the adsorbing bed and pressure reduction.

In the case of a VSA process, the adsorption step is carried out at atmospheric pressure or a slightly higher value whereas the desorption step is effected by reducing the pressure to vacuum.

In the case of a PVSA process, the adsorption step is carried out at high pressure whereas the desorption step is effected by reducing the pressure to vacuum. A process of the PVSA type is therefore a particular case of the PSA process wherein the desorption is effected under vacuum.

In cases in which the use of a vacuum is not envisaged, the desorption can be facilitated by the contextual washing of the adsorbing bed, for example by partial recycling of the pure non-withheld component or with an inert gas not contained in the feeding.

The process of the present invention is preferably effected by means of Pressure Swing Adsorption (PSA) or Pressure-thermal Swing Adsorption (PTSA).

A particular aspect of the present invention is therefore a process for the separation of gases of the PSA type which comprises the following steps:
a) putting a mixture of gases in contact at a high pressure with a zeolite of the ESV type, preferably ERS-7, to selectively adsorb at least one of the gases forming the mixture and collecting or discharging the remaining gaseous components of the mixture;
b) interrupting the flow of gaseous mixture and optionally reducing the pressure;
c) desorbing the gas or gases adsorbed in step a), by partial pressure reduction of the gas or gases adsorbed, and collecting or discharging them;
d) repressurizing the system with the mixture of gases fed.

The adsorption step (a) can be carried out at a temperature ranging from 0° to 40° C., preferably at room temperature, and at an adsorption pressure ranging from 10 to 90 bara, preferably from 10 to 40 bara.

In step (c), the desorption pressure can be selected from 0.5 to 10 bara whereas the temperature ranges from 0° to 40° C., and is preferably room temperature.

When, in step (c), the desorption is carried out under vacuum, the process will be in particular of the PVSA type.

When the process of the present invention is carried out by means of PTSA, the adsorption step (a) is carried out under the same conditions described above, whereas the desorption step (c) is effected by a temperature increase of the adsorption bed and pressure reduction: it is therefore preferable to operate at a pressure ranging from 0.5 to 10 bara and a temperature ranging from 50 to 200° C., even more preferably from 60 to 100° C.

In both PSA and PTSA cases, the desorption process and consequently the regeneration of the zeolite are favoured by washings with gas, such as for example $N_2$, $CH_4$, air or hydrogen.

The process of the present invention can be well applied in particular to the purification of natural gas from contaminants selected from nitrogen, $CO_2$, $H_2S$ and water, the latter in a quantity at the maximum equal to the saturation of the gaseous mixture. The contaminants are preferably adsorbed with respect to methane. According to a preferred aspect the process of the present invention is used for the purification of methane from $CO_2$ and $H_2S$, and even more preferably for the separation of $CO_2$ from methane.

According to what is specified above, a particularly preferred aspect of the present invention is therefore a process of the PSA type for the separation of carbon dioxide, and possibly $H_2S$, from a gaseous mixture containing them together with methane, comprising the following steps:
a) putting said gaseous mixture in contact, at a high pressure, with a zeolite of the ESV type, preferably ERS-7, to selectively adsorb carbon dioxide and if present, $H_2S$, and collecting the remaining gaseous component containing methane;
b) interrupting the flow of gaseous mixture and optionally reducing the pressure;
c) desorbing the carbon dioxide and, if present, $H_2S$, adsorbed in step (a), by partial pressure reduction of the gas or gases adsorbed, and collecting or discharging them;
d) repressurizing the system with the mixture of gases fed.

When the separation of carbon dioxide and optionally, $H_2S$, from a gaseous mixture containing them together with methane, is effected by means of PTSA, the desorption step (c) is carried out by a temperature increase of the adsorbing bed and pressure reduction.

The same general pressure and temperature conditions described above are applied to the separation of natural gas from contaminants selected from nitrogen, $CO_2$, $H_2S$ and water, by means of a process of the PSA or PTSA type.

The process of the present invention can also be used in the separation of hydrogen from mixtures containing carbon dioxide, carbon monoxide and hydrocarbons, such as for example the gaseous effluents from steam methane reforming. In this case, hydrogen is the non-adsorbed component.

The following examples describe the use of a zeolite of the ESV type, in different cationic forms, in the adsorption and separation of gases. The results of the tests are expressed using, as parameter connected to the adsorbing properties of a material, the adsorption capacity at equilibrium (Nml/g), expressed as quantity of gas adsorbed at equilibrium under certain conditions (T, P).

The sole purpose of the following examples is to describe the present invention in greater detail and they should in no way be interpreted as a limitation of its scope.

EXAMPLE 1 synthesis with N,N-di-methyl-piperidinium hydroxide

A solution consisting of 14.10 g of $H_2O$ and 1.26 g of $Al_2(SO_4)_3 \cdot 16H_2O$ is added under stirring to a solution consisting of 14.10 g of demineralized water, 11.11 g of sodium silicate (27% w/w $SiO_2$, 8% w/w of $Na_2O$) and 1.31 g of N,N-di-methyl-piperidinium hydroxide (R—OH).

A suspension is obtained, having the following composition expressed as molar ratios:

$SiO_2/Al_2O_3=25$ $R/SiO_2=0.2$ $H_2O/SiO_2=40$ $Na^+/Al_2O_3=15$ $OH^-/SiO_2=0.5$

The suspension is charged into a steel autoclave, placed in an oven and left for 7 days at 170° C. under autogenous pressure. After cooling to room temperature, the crystalline product is separated from the mother liquor by filtration, washed with demineralized water and dried at 120° C. for 2 hours.

The X-ray diffraction spectra from powders relating to the sample obtained after drying identify it as ERS-7, or as a pure ESV phase, free from other crystalline phases.

The sample obtained was calcined at 600° C. for 10 hours in air.

EXAMPLE 2 synthesis with N,N-di-methyl-piperidinium bromide

A solution consisting of 1034.4 g of $H_2O$ and 90.61 g of $Al_2(SO_4)_3 \cdot 16H_2O$ is added under stirring to a solution consisting of 1034.4 g of demineralized water, 798.5 g of sodium silicate (27% w/w $SiO_2$, 8% w/w of $Na_2O$), 174.2 g of N,N-di-methyl-piperidinium bromide R—Br) and 35.9 g of sodium hydroxide.

A suspension is obtained, having the following composition expressed as molar ratios:

$SiO_2/Al_2O_3=25$ $R/SiO_2=0.25$ $H_2O/SiO_2=40$ $Na^+/Al_2O_3=21$ $OH^-/SiO_2=0.50$

The suspension is charged into an AISI316 steel autoclave, equipped with an anchor stirrer. The suspension is subjected to hydrothermal treatment at autogenous pressure for 9 days at 170° C. After cooling to room temperature, the crystalline product is separated from the mother liquor by filtration, washed with demineralized water and dried at 120° C. for 2 hours.

The X-ray diffraction spectra from powders relating to the sample obtained after drying identify it as zeolite of the ERS-7 type, or as a pure ESV phase, free of other crystalline phases.

The sample obtained was calcined at 600° C. for 10 hours in air. The sample has the following molar composition, determined by means of chemical analysis:

$SiO_2/Al_2O_3=16.5$ $Na_2O/Al_2O_3=0.36$

EXAMPLE 3

Synthesis with a Templating Agent Prepared In Situ

A mixture consisting of: 1482.8 g of demineralized water, 35.8 g of NaOH, 140.4 g of a solution at 33% in ethanol of di-methyl amine and 205.95 g of 1,5-dibromo pentane, is charged into an AISI316 steel autoclave, equipped with an anchor stirrer. The autoclave is closed and the mixture heated to 90° C. for 4 hours under stirring at 170 rpm. After cooling to room temperature by means of a nozzle, the following products are introduced still under constant stirring: a solution obtained by dissolving 17.90 g of NaOH in 49.85 g of demineralized water, 1195.9 g of sodium silicate (18.0% w/w of $SiO_2$, 5.3% w/w of $Na_2O$) and a solution obtained by dissolving 90.25 g of $Al_2(SO_4)_3 \cdot 16H_2O$ in 281.15 g of demineralized water.

A reagent suspension is obtained having the following composition expressed as molar ratios:

$SiO_2/Al_2O_3=25$ $R/SiO_2=0.25$ $H_2O/SiO_2=43$ $Na^+/Al_2O_3=24$ $OH^-/SiO_2=0.4$ wherein R is dimethylpiperidinium, for which a yield of 100% is considered. The reaction mixture is kept under constant stirring (170 rpm) for 7 days at a temperature of 170° C. under autogenous pressure. After cooling to room temperature, the crystalline product is separated from the mother liquor by filtration, washed with demineralized water and dried at 120° C. for 2 hours.

The X-ray diffraction spectra from powders relating to the sample obtained after drying identify it as ERS-7, or as a pure ESV phase, free of other crystalline phases.

The sample obtained was calcined at 600° C. for 10 hours in air.

EXAMPLE 4

Cationic Exchange with $Na^+$ 66 g of the sample of Example 2 were added to 380 g of a 1 M solution of sodium acetate. The suspension was left under stirring for 1 hour at 80° C. The solid was then separated by filtration and the treatment was repeated with a fresh solution of sodium acetate.

The separated solid was subsequently washed twice with 350 g of $H_2O$ at room temperature for 30 minutes, then dried at 100° C. for 1 hour and calcined for 3 hours at 400° C.

The sample has the following molar composition, determined by chemical analysis:

$SiO_2/Al_2O_3=15.9$ $Na_2O/Al_2O_3=0.84$

EXAMPLE 5

Cationic Exchange with $Sr^{2+}$ 60 g of the sample of Example 2 were added to 2000 g of a 0.35 M solution of strontium chloride. The suspension was brought to reflux temperature for 30 minutes, the solid was then filtered and washed by redispersion in 1000 g of water at 70° C. for 1 hour. The exchange treatment and washing were repeated for a total of three times. The final product was then dried at 150° C.

EXAMPLES 6-10

The samples of Examples 1-5 were pretreated under vacuum at 275° C. for 14 hours. The adsorption/desorption isotherms for $N_2$, $CO_2$, $CH_4$ ($P_{max}$=1 bara, T=273 K) were obtained.

The maximum adsorption capacity at equilibrium for $N_2$, $CO_2$, $CH_4$ are indicated in Table 1.

TABLE 1

| Example | Adsorbent | $N_2$ (Nml/g) | $CH_4$ (Nml/g) | $CO_2$ (Nml/g) |
|---|---|---|---|---|
| Example 6 | Example 1 | 10 | 8 | 81 |
| Example 7 | Example 2 | 7 | 5 | 83 |
| Example 8 | Example 3 | 8 | 6 | 80 |
| Example 9 | Example 4 | n.d. | 4 | 79 |
| Example 10 | Example 5 | n.d. | 1 | 80 |

From the data indicated in Table 1, it can be deduced that the materials synthesized according to what is specified in Examples 1-5 preferably adsorb $CO_2$, with high selectivities with respect to $CH_4$.

EXAMPLE 11

The adsorption capacity of $CH_4$ and $CO_2$ under pressure was evaluated on a sample of ERS-7 zeolite, synthesized as indicated in Example 2, using a static-volumetric method.

The adsorbing material was degassed before the measurement by means of in situ treatment at a temperature of 350° C., under vacuum, for 16 hours.

The adsorption capacities at equilibrium at different pressures, at a temperature of 0° C., are indicated in FIG. 1.

The adsorption of $CO_2$ is decisively higher with respect to that of $CH_4$ at all the pressures. The poor affinity of ERS-7 zeolite with respect to $CH_4$ is also demonstrated by the long adsorption times: for example at 7.2 bara approximately 100 hours are required to reach equilibrium conditions.

EXAMPLE 12

Competitive Adsorption of $CO_2$

A tubular adsorber was charged with ERS-7 synthesized as described in Example 2, pelleted and granulated at 20-40 mesh.

The adsorbing agent was degassed in situ at 350° C., under vacuum, for 16 hours.

After the cooling of the system until stabilization of the pre-selected temperature is reached, a gaseous mixture having a composition of $CH_4/CO_2/N_2$=64/23/13 (% vol.), was fed to the adsorber.

The following adsorption operating conditions were adopted:

$T$=24° C.

$P$=31 barg

The gas chromatographic analyses effected on the effluent from the adsorber revealed the breakthrough of the $CO_2$ from the adsorbing bed after about 30 minutes.

Before this time, the quantity of $CO_2$ contained in the outgoing gas proved to be lower than the detectability limits of the gas chromatographic analysis adopted (i.e. lower than 0.1% vol.).

As a whole, the adsorption of $CO_2$ referring to the weight of adsorbing material proved to be equal to 89 Nml/g.

This value is comparable to the equilibrium value (obtained from the measurements described in Example 11, effected with pure $CO_2$) and reveals the selectivity of the ERS-7 zeolite. Also in the presence of a large excess of $CH_4$ in the feeding gas, the ERS-7 zeolite tends to preferably adsorb $CO_2$.

EXAMPLE 13

This example shows the regeneration of ERS-7 zeolite by the depressurization and washing of the adsorbing bed with $CH_4$.

After an adsorption under pressure effected according to the procedures described in Example 12, the regeneration in situ of the adsorbing bed was effected.

The operation was carried out by the depressurization and subsequent washing of the adsorbing bed with $CH_4$.

The following regeneration operating conditions were used:

$T$=24° C.

$P$=3 barg

In order to evaluate the regenerability of the ERS-7 zeolite, 5 adsorption/regeneration cycles were repeated according to the procedures described above.

Table 2 indicates the quantities of $CO_2$ adsorbed (referring to the weight of adsorbing material) with the succession of cycles.

EXAMPLE 14

This example relates to the regeneration of ERS-7 zeolite by the depressurization and washing of the adsorbing bed with $N_2$.

Example 13 was repeated using nitrogen for the washing of the adsorbing bed.

Table 2 indicates the quantities of $CO_2$ adsorbed (referring to the weight of adsorbing material) with the succession of cycles.

TABLE 2

| Cycles | Example 13 (washing with $CH_4$) $CO_2$ Ads. [Nml/g] | Example 14 (washing with $N_2$) $CO_2$ Ads. [Nml/g] |
|---|---|---|
| 1 | 89 | 87 |
| 2 | 81 | 80 |
| 3 | 80 | 81 |
| 4 | 83 | 82 |
| 5 | 80 | 80 |

The data indicated in Table 2 show that ERS-7 zeolite can be regenerated by depressurization and washing with CH$_4$ or N$_2$ at room temperature.

EXAMPLE 15

This example shows the regeneration of ERS-7 zeolite by depressurization and washing of the adsorbing bed under heating.

5 successive adsorption/regeneration cycles were effected on a sample of ERS-7 zeolite, synthesized as described in Example 2, using the equipment described in Example 11. The adsorption operations were carried out using the same operating conditions and the same mixture of gases as described in Example 12.

The regeneration operations were effected by depressurization, heating and washing of the adsorbing bed with CH$_4$ under heating.

The following regeneration operating conditions were used:

$T=120°$ C.

$P=9$ barg

Table 3 indicates the quantities of CO$_2$ adsorbed (referring to the weight of adsorbing material) with the succession of the cycles.

TABLE 3

| Cycles | CO$_2$ Ads. [Nml/g] |
|---|---|
| 1 | 87 |
| 2 | 82 |
| 3 | 83 |
| 4 | 81 |
| 5 | 83 |

The data indicated in Table 3 show that the ERS-7 zeolite can be regenerated by depressurization and washing with CH$_4$ under heating.

The invention claimed is:

1. A process for the separation of gases which comprises contacting a mixture of gases with an ESV type zeolite for selectively adsorbing at least one of the gases in the mixture, wherein the ESV type zeolite is the sole zeolite in the process, wherein the mixture of gases comprises
   (a) hydrogen containing carbon dioxide, carbon monoxide and hydrocarbons, wherein the carbon dioxide, carbon monoxide and hydrocarbons are adsorbed, or
   (b) natural gas containing one or more pollutants selected from the group consisting of nitrogen, carbon dioxide and H$_2$S, wherein said pollutants are adsorbed.

2. The process according to claim 1, further comprising a desorption step of the gases adsorbed.

3. The process according to claim 2, wherein the desorption step is carried out at a pressure ranging from 0.5 to 10 bara and a temperature ranging from 0 to 40° C.

4. The process according to claim 2, wherein the desorption step is carried out at a pressure ranging from 0.5 to 10 bara and a temperature ranging from 50 to 200° C.

5. The process according to claim 4, wherein the temperature ranges from 60 to 100° C.

6. The process according to claim 2, wherein the desorption step is followed by washings with a gas selected from N$_2$, CH$_4$, air or hydrogen.

7. The process according to claim 1, wherein the zeolite is an ERS-7 zeolite.

8. The process according to claim 7, wherein the zeolite is a zeolite of the ERS-7 type having in the calcined and anhydrous form the following general formula (I):

$M_{2/n}O \cdot Al_2O_3 \cdot xSiO_2$ wherein M is a cation having a valence n selected from H$^+$, metallic cations of the IA group, metallic cations of the IIA group and their mixtures, n=1 or 2, and x has a value ranging from 15 to 30.

9. The process according to claim 8, wherein M is at least a cation selected from H$^+$, Li$^+$, Na$^+$, K$^+$, Mg$^{2+}$, Ca$^{2+}$, Sr$^{2+}$, Ba$^{2+}$.

10. The process according to claim 9, wherein M is Na$^+$ or Na$^+$ and H$^+$, optionally mixed with one or more cations selected from Li$^+$, Na$^+$, K$^+$, Mg$^{2+}$, Ca$^{2+}$, Sr$^{2+}$, Ba$^{2+}$.

11. The process according to claim 10, wherein the zeolite of the ERS-7 type is in the form directly deriving from the synthesis, after drying and calcination, containing sodium ions and H$^+$ ions.

12. The process according to claim 8, wherein M is at least partly a sodium ion and is in a quantity ranging from 0.2 and 1 expressed as a molar ratio Na/Al.

13. The process according to claim 1, wherein the zeolite is used in bound form with an inorganic binder selected from inorganic materials such as clays, oxides of silicon, aluminum, titanium, zirconium and mixtures thereof.

14. The process according to claim 13, wherein the zeolite is used in bound form and in a quantity ranging from 50 to 95% by weight with respect to the total weight of the product formed by the zeolite and binder.

15. The process according to claim 14, wherein the zeolite is in a quantity ranging from 60 to 90% by weight.

16. The process according to claim 1, wherein the ESV type zeolite is contained in a membrane.

17. The process according to claim 1, effected by means of adsorption cycles.

18. The process according to claim 17, effected by means of adsorption cycles of the pressure swing adsorption (PSA), thermal swing adsorption (TSA), vacuum swing adsorption (VSA), pressure-thermal swing adsorption (PTSA), or pressure-vacuum swing adsorption (PVSA) type.

19. The process according to claim 18, wherein the process is effected by means of adsorption cycles of the PSA or PTSA type.

20. A process according to claim 19, wherein the means of adsorption is of the PSA type and comprising the following steps:
   a) putting a mixture of gases in contact at a high pressure with a zeolite of the ESV type, to selectively adsorb at least one of the gases forming the mixture and collecting or discharging the remaining gaseous components of the mixture;
   b) interrupting the flow of gaseous mixture and optionally reducing the pressure;
   c) desorbing the gas or gases adsorbed in step a), by partial pressure reduction of the gas or gases adsorbed, and collecting or discharging them;
   d) repressurizing the system with the mixture of gases fed.

21. The process according to claim 20, wherein the zeolite is ERS-7.

22. A process of the PTSA type according to claim 19, wherein the means of adsorption is of the PTSA type and comprising the following steps:
   a) putting a mixture of gases in contact at a high pressure with a zeolite of the ESV type to selectively adsorb at least one of the gases forming the mixture and collecting or discharging the remaining gaseous components of the mixture;
b) interrupting the flow of gaseous mixture and optionally reducing the pressure;
c) desorbing the gas or gases adsorbed in step a), by raising of the temperature of the zeolite and partial pressure reduction of the gas or gases adsorbed, and collecting or discharging them;
d) repressurizing the system with the mixture of gases fed.

23. The process according to claim 1, wherein the adsorption is carried out at a temperature ranging from 0 to 40° C. and a pressure ranging from 10 to 90 bara.

24. The process according to claim 23, wherein the adsorption is carried out at an adsorption pressure ranging from 10 to 40 bara.

25. The process according to claim 1, wherein the mixture of gases comprises (a) hydrogen containing carbon dioxide, carbon monoxide and hydrocarbons, wherein the carbon dioxide, carbon monoxide and hydrocarbons are adsorbed.

26. The process according to claim 1, wherein the mixture of gases comprises (b) natural gas containing one or more pollutants selected from the group consisting of nitrogen, carbon dioxide and $H_2S$, wherein said pollutants are adsorbed.

27. The process according to claim 1, wherein the mixture of gases comprises natural gas containing carbon dioxide.

* * * * *